United States Patent
Inaba

(10) Patent No.: US 8,503,274 B2
(45) Date of Patent: Aug. 6, 2013

(54) OPTICAL DISC DEVICE THAT OPERATES WITH A REDUCED CURRENT CONSUMPTION AFTER A POWER-ON RESET, AND METHOD THEREOF

(75) Inventor: Seiji Inaba, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/314,217

(22) Filed: Dec. 8, 2011

(65) Prior Publication Data

US 2012/0151507 A1   Jun. 14, 2012

(30) Foreign Application Priority Data

Dec. 13, 2010   (JP) ................................ 2010-276931

(51) Int. Cl.
*G11B 11/00* (2006.01)
(52) U.S. Cl.
USPC ................. 369/53.12; 369/53.37; 369/53.45
(58) Field of Classification Search
None
See application file for complete search history.

(56) References Cited

U.S. PATENT DOCUMENTS

| | | | |
|---|---|---|---|
| 2002/0172115 A1* | 11/2002 | Tsukihashi | 369/53.18 |
| 2005/0088931 A1* | 4/2005 | Takeuchi et al. | 369/44.29 |
| 2006/0221778 A1* | 10/2006 | Nakamura et al. | 369/30.01 |
| 2007/0070836 A1* | 3/2007 | Kitagawa | 369/44.11 |
| 2008/0122292 A1 | 5/2008 | Minami | |
| 2008/0247284 A1* | 10/2008 | Chou et al. | 369/47.51 |
| 2010/0315920 A1* | 12/2010 | Hua et al. | 369/47.38 |

FOREIGN PATENT DOCUMENTS

| | | |
|---|---|---|
| JP | 2005-50194 | 2/2005 |
| JP | 2005-135376 | 5/2005 |
| JP | 2005-301390 | 10/2005 |
| JP | 2008-27114 | 2/2008 |

* cited by examiner

*Primary Examiner* — Paul Huber
(74) *Attorney, Agent, or Firm* — Antonelli, Terry, Stout & Kraus, LLP.

(57) ABSTRACT

When power is supplied to an ODD used by being externally attached to a PC via a USB port, it is desirable not to cause an error to occur owing to occurrence of a power-on reset even when the power supplying ability of the PC is insufficient. After the ODD has been connected with the PC and started, the ODD executes an operation of large current consumption for a predetermined period of time and judges whether a power-on reset occurs or not while the operation is being executed. When the power-on reset does not occur, the ODD is set to operate on the basis of the highest specification. When the power-on reset has occurred, the specification is set lower so as to operate the ODD with reduced current consumption.

12 Claims, 2 Drawing Sheets

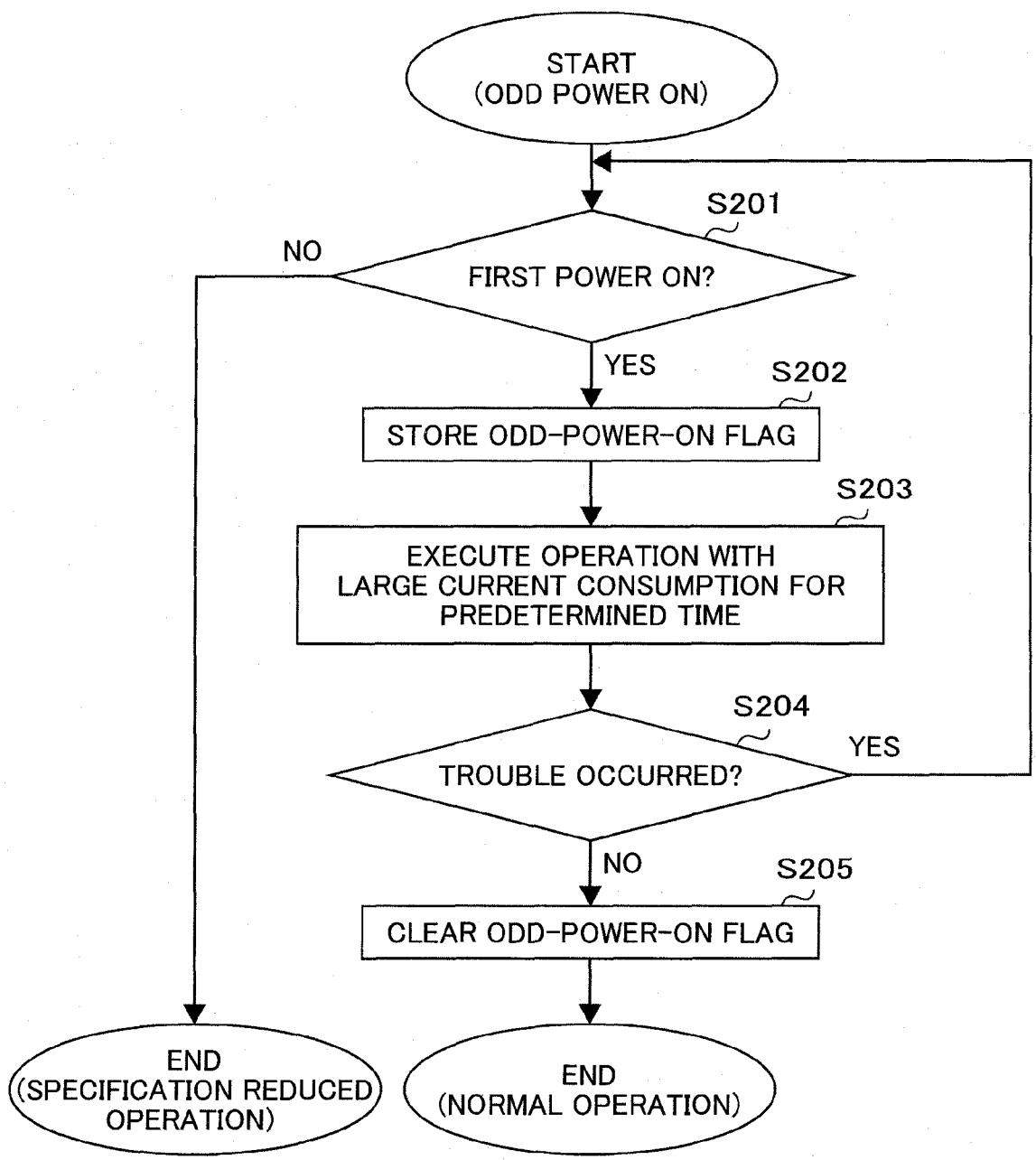

OPTICAL DISC DEVICE THAT OPERATES WITH A REDUCED CURRENT CONSUMPTION AFTER A POWER-ON RESET, AND METHOD THEREOF

INCORPORATION BY REFERENCE

This application relates to and claims priority from Japanese Patent Application No. 2010-276931 filed on Dec. 13, 2010, the entire disclosure of which is incorporated herein by reference.

BACKGROUND OF THE INVENTION

1. Field of the Invention

The present invention relates to an optical disc device and a method of setting an operation mode of the optical disc device, and more particularly relates to an optical disc device and a method of setting an operation mode of the optical disc that avoids occurrence of an operational fault caused by the power supplying capability of a host device used.

2. Description of the Related Art

In an information processing device such as a PC (Personal Computer), an optical disc device (hereinafter, abbreviated as an ODD (Optical Disc Drive) as the case may be) is used as one of information storage devices in many cases. Recently, the number of ODDs of the type used by being externally attached to a PC is increased.

When an ODD is used by being externally attached to a PC, a USB (Universal Serial Bus) is used as an interface between them in many cases. The power that an ODD uses is supplied from a power adapter which is designed for the ODD or is supplied from a PC via the USB.

When the power to be supplied to the ODD is supplied from the PC via the USB, it is desirable to pay attention to the power supplying capability of the PC. Even if one ODD operates with no problem when it is connected with a PC of one manufacturer, when it is connected with a PC of another manufacturer, an operational fault may sometimes occur owing to insufficient power supplying capability of the PC.

Japanese Patent Application Laid-Open No. 2005-135376 (hereinafter, referred to as Patent Document 1) discloses a power diagnosing method of test-operating connected equipment in accordance with a control program that a PC holds to evaluate whether the power supply from the PC is possible.

Japanese Patent Application Laid-Open No. 2005-50194 (hereinafter, referred to as Patent Document 2) discloses a device that judges whether the power supplying capability of a PC used is sufficient by transmitting or receiving a signal when the PC supplies the power of an ODD via an USB and supplies the power to the ODD when it is sufficient.

Japanese Patent Application Laid-Open No. 2005-301390 (hereinafter, referred to as Patent Document 3) discloses a device that selects a power source that can supply the power to an ODD from a plurality of power sources and switches a condition concerning data transfer in accordance with the power supplying capability of the selected power source. Japanese Patent Application Laid-Open No. 2008-27114 (hereinafter, referred to as Patent Document 4) discloses a device that uses two USB ports so as to ensure the necessary supply power.

SUMMARY OF THE INVENTION

The supply current which is supplied via one USB port is standardized to 500 mA. Since an ODD is too much in current consumption as a device to be externally attached to a PC, the ODD receives a maximum current of 1 A which is supplied via two USB ports as disclosed in Patent Document 4, or the ODD receives the power which is supplied via another power adapter. It goes without saying that a method of receiving the power which is supplied via the USB ports without using another power adapter is convenient to be used for a user.

Even when the power is supplied to the ODD via two USB ports, it is desirable to operate the ODD with a current of 1 A or less. However, in fact, the current that the ODD uses reaches a value around the above mentioned value and the margin is insufficient when taking a variation among constitutional elements built into the ODD and a change in surrounding temperature into consideration in the actual circumstances. Although it is a matter of course that the current supplying capability of a power circuit of a PC exceeds a value standardized for the USB port, the current which may be actually supplied is different among different manufacturers or types of devices.

Even in case of an ODD that normally operates when connected with a PC of one manufacturer, it may sometimes occur that its power supply voltage drops when connected with a PC of another manufacturer and the ODD generates a power-on reset for restarting it by itself. Although the power-on reset is liable to generate when the current consumption is temporarily increased, for example, when data is written or read at a high speed, such an inconvenience may associate that an error occurs when the data is written or read.

It is a problem for a user that whether an ODD that the user has purchased may operate with the power supplied from a PC used with no occurrence of the above mentioned error is not found until the ODD is actually connected with the PC and is used. Although it may be also conceived that the user purchases a power adapter separately when errors occur so frequently that the ODD may not be used any more, handiness is reduced and a cost involved in purchasing the adapter causes another problem.

The above mentioned patent documents are described as documents involving the above mentioned problems. In Patent Document 1, it is necessary to hold a control program in a PC and to prepare a test mode which is different from a normal use state. In Patent Document 2, when the power supplying capability of a PC used is insufficient, the ODD may not operate with the power supplied via the USB port. In Patent Document 3, since a speed at which the data is written or read is restricted when the power is supplied via the USB port and the ODD may not operate at a maximum speed even when the power supplying capability of the PC used is sufficient, it is desirable to consider that the ODD exhibits its maximum operational performance within a range of the power supplying capability of a PC used.

The present invention has been made in view of the above mentioned problems and an object of the present invention is to provide an optical disc device and a method of setting an operation mode of the optical disc device that avoids occurrence of an operational fault caused by the power supplying capability of a host device used.

In order to solve the above mentioned problems, according to an embodiment of the invention, an optical disc device that regenerates information data from data in an optical disc with the power supplied from a host device includes a spindle motor for rotating the optical disc, an optical pickup having an objective lens through which the optical disc is irradiated with a laser beam, a tracking actuator for finely adjusting a radial position of the objective lens relative to the optical disc, a focus actuator for finely adjusting a vertical position of the objective lens relative to the optical lens, and a photodetector for detecting light of the laser beam which is reflected from the optical disc and reading and converting the information data written in the optical disc into an electric signal to be output, a sled motor for moving the optical pickup in a radius direction relative to the optical disc to determine a relative position, a servo unit for generating a drive signal used to finely adjust the position of the objective lens relative to the optical disc and supplying the drive signal to the tracking actuator and the focus actuator, a signal processing unit for processing the electric signal output from the optical pickup, supplying the electric signal to the host device, and also supplying the electric signal to the servo unit in order to generate the drive signal and a control unit for controlling the operation of the optical disc, wherein, when it has been judged that a power-on reset for re-starting the optical disc device has occurred after the optical disc device has been connected with the host device and started, the control unit controls so as to perform an operation of which current consumption is reduced.

According to another embodiment of the present invention, a method of setting an operation mode of an optical disc device that regenerates information data from data in an optical disc with the power supplied from a host device includes the power supply state judging step of judging whether the optical disc device is in a power supply state before the operation mode is set, the current consumption increasing step of, when it has been judged that optical disc device is in the power supply state before the operation mode is set as a result of judgment in the power supply state judging step, storing that the optical disc device is in the power supply state and increasing the current consumption for a predetermined period of time and the power-on reset judging step of judging whether a power-on reset has occurred in the current consumption increasing step, wherein when it has been judged that the power-on reset has not occurred as a result of judgment in the power-on reset judging step, memory that the optical disc device is in the power supply state is cleared and the optical disc device is set to a predetermined operation mode, and when it has been judged that the power-on reset has occurred as a result of judgment in the power-on reset judging step, the optical disc device is set to an operation mode which is smaller than the predetermined operation mode in current consumption.

According to the present invention, an optical disc device that avoids occurrence of an operational fault caused by the power supplying capability of a host device used, and a method of setting an operation mode of the optical disc device are provided and such an effect may be obtained that the invention contributes to an improvement in handiness for a user.

BRIEF DESCRIPTION OF THE DRAWINGS

These and other features, objects and advantages of the present invention will become more apparent from the following description when taken in conjunction with the accompanying drawing wherein:

FIG. 2 is a flowchart of a method of setting an operation mode of an optical disc device according to an embodiment.

DETAILED DESCRIPTION OF THE EMBODIMENT

Figure 1:
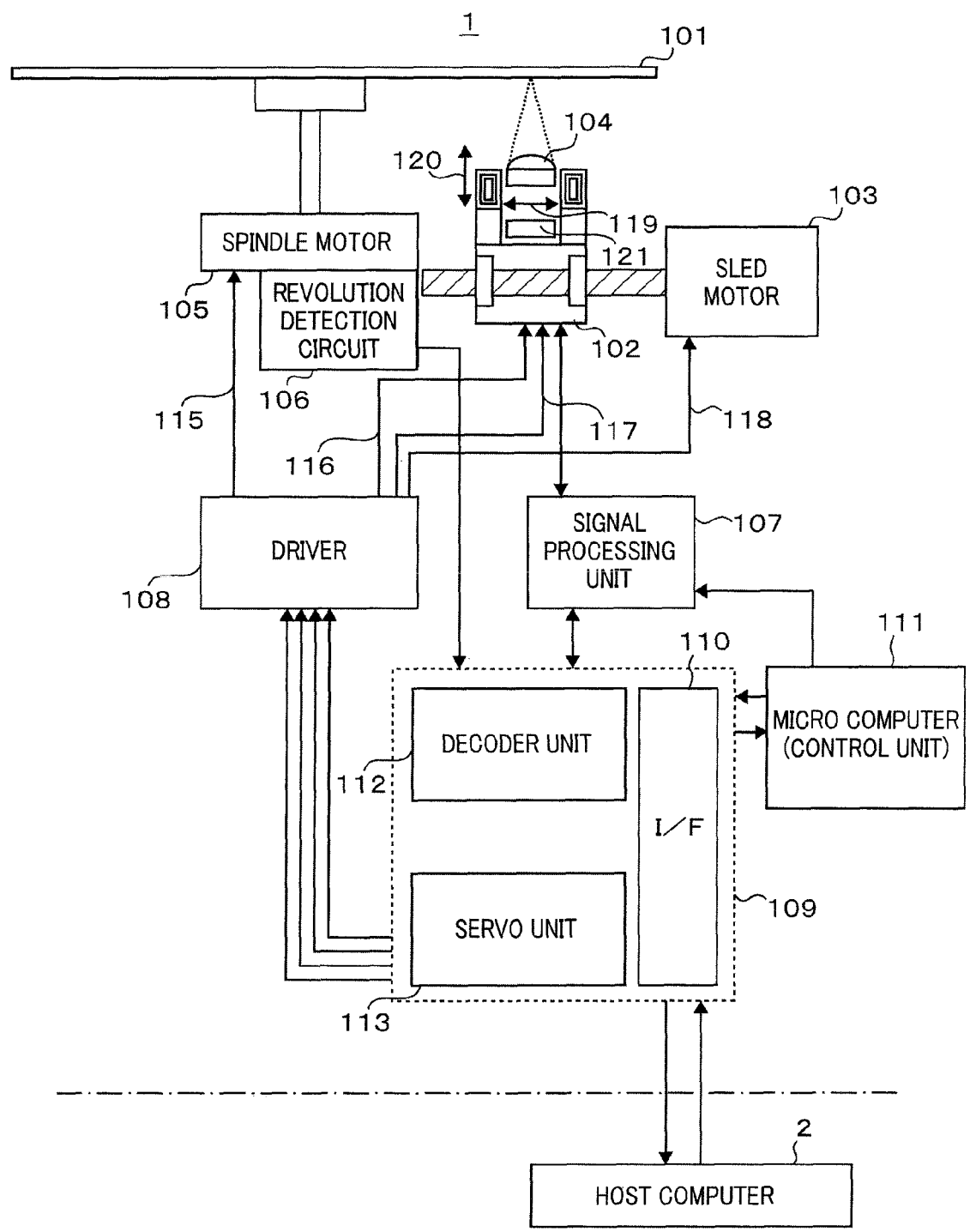
FIG. 1 is a block diagram of an optical disc device according to an embodiment of the present invention.

Hereinafter, embodiments of the present invention will be described with reference to the accompanying drawings. First, the general operation of an optical disc device (ODD) will be described.

FIG. 1 is a block diagram of an optical disc device 1 according to an embodiment of the present invention. An optical disc 101 which is a recording medium is, for example, a DVD (Digital Versatile Disc) or a BD (Blu-ray Disc). It may be a write-once disc into which data is recorded only once such as a DVD-R or a BD-R, a re-writable disc such as a DVD-RAM or a BD-RE, or a read-only disc such as a DVD-ROM. The optical disc 101 loaded on the optical disc device is rotated and driven by a spindle motor 105 at a predetermined rotating speed (for example, a rotating speed at which a predetermined linear velocity is attained at a position where data is recorded or regenerated). Thus, a spindle motor control signal 115 is generated from a servo unit 113 included in a DSP (Digital Signal Processor) 109, is power-amplified by a driver 108, and then is supplied to the spindle motor 105. A revolution detection circuit 106 is disposed in order to generate the spindle motor control signal 115 from the servo unit 113, and a signal indicating the revolution of the spindle motor 105 that the revolution detection circuit 106 generates is supplied to the DSP 109.

An optical pickup 102 irradiates a recording surface of the optical disc 10 with a laser beam through an objective lens 104 to record or regenerate data.

The optical pickup 102 is loaded on a sled mechanism, moves toward the optical disc 101 in a radius direction with rotation of a sled motor 103, and records or regenerates data at a predetermined position on a track. A sled motor control signal 118 used for the above mentioned operation is generated from the servo unit 113, is power-amplified by the driver 108 and is then supplied to the spindle motor 103.

The objective lens 104 is loaded on a tracking actuator 119 and a focus actuator 120 (in FIG. 1, the actuators 119 and 120 are illustrated only in a direction in which the objective lens 104 is driven in order to avoid complication) using electromagnetic force.

A tracking actuator control signal 116 which has been generated from the servo unit 113 and power-amplified by the driver 108 is supplied to the tracking actuator 119. The position of the objective lens 104 in a radius direction (a tracking direction) relative to the optical disc 101 is fine-adjusted on the basis of the supplied signal 116 such that a laser beam correctly traces on a predetermined recording track of the optical disc 101. In addition, a focus actuator control signal 117 which has been generated from the servo unit 113 and power-amplified by the driver 108 is supplied to the focus actuator 120. The position of the objective lens 104 in a vertical direction (a focusing direction) relative to the optical disc 101 is fine-adjusted on the basis of the supplied signal 117 such that the laser beam correctly focuses on the predetermined recording track of the optical disc 101.

A photodetector 121 included in the optical pickup 102 detects light of the laser beam which is reflected from the optical disc 101, detects an information signal recorded in the optical disc 101 and converts the signal into an electric signal. The detected information signal is supplied to a signal processing unit 107. The signal processing unit 107 includes a circuit block which is also called an AFE (Analog Front End) circuit. The AFE circuit processes the information signal which is in a state that it is to be processed essentially as an analog signal though in digital recording. That is, the signal processing unit 107 generates, for example, a tracking control signal and a focus control signal by arithmetically processing the information signal and supplies the generated signals to the servo unit 113 included in the DSP 109. The servo unit 113 generates servo signals used for tracking and focusing, that is, the tracking actuator control signal 116 and the focus actuator control signal 117 which have been described above on the basis of the supplied tracking control signal and focus control signal and supplies these signals to the optical pickup 102 via the driver 108 to control the above mentioned tracking operation and focusing operation.

The signal processing unit 107 equalizes frequency characteristics of amplitude and a phase when the data has been recorded into the optical disc 101 or has been regenerated from data in the optical disc 101, and then supplies equalized data to a decoder unit 112 included in the DSP 109. The decoder unit 112 regenerates the information signal recorded in the optical disc 101. For example, the decoder unit 112 performs expansion processing, which is reverse to data compression processing performed on the information signal before recorded into the optical disc 101, to decode the original information signal. The signal processing unit 107 is integrally mounted on a semiconductor chip onto which the DSP 109 is also mounted in some cases.

The above mentioned operations of the optical disc device 1 are performed on the basis of control signals that a micro computer 111 generates. The micro computer 111 is also integrally mounted on the semiconductor chip onto which the DSP 109 is also mounted in some cases. In the following, the micro computer 111 will be expressed as a control unit 111 in some cases.

An operating command which is given, for example, from a user is generated by a host computer 2 which is a host device of the optical disc device 1. An I/F (interface) unit 110 included in the DSP 109 intermediates communication between the host device and the optical disc device 1, by which a command signal generated from the host computer 2 is transmitted to the optical disc device 1. Here, the above mentioned PC corresponds to the host computer 2 and the above mentioned USB port corresponds to the I/F unit 110. That is, the optical disc 1 receives the operating power supplied from the host computer 2 via the I/F unit 110.

The information signal decoded by the decoder unit 112 is supplied to the host computer 2 via the I/F unit 110. The information signal which has been supplied reversely from the host computer 2 via the I/F unit 110 is subjected to predetermined modulating operation and encoding operations for recording by a recording signal processing circuit included in the signal processing unit 107 and then is recorded onto the recording track of the optical disc 101 with a laser beam generated from the optical pickup 102.

As major factors for determining the current consumption of the optical disc device 1, the following factors may be given. First, the current consumption is increased when the spindle motor 105 is rotated by the spindle motor control signal 115 at a high speed in order to record or regenerate data at a high speed (for example, the ×4 speed, the ×8 speed or the like). In addition, the current consumption is also increased at start up for rotation and at speed change of the spindle motor 105. The current consumption may be sometimes increased when the sled motor 103 is driven by the sled motor control signal 118 in order to change the position of the optical pickup 102. The current consumption may be sometimes increased instantaneously when the tracking actuator 119 is driven by the tracking actuator control signal 116 and the focus actuator 120 is driven by the focus actuator control signal 117. The current consumption may be sometimes increased in order to make a not illustrated loading mechanism function when the optical disc 101 is loaded on the optical disc device 1.

In the case that the power supplying capability of a power source that supplies the power via a USB port is insufficient and hence the power supply voltage drops, for example, when the current consumption has been increased because of one of factors as described above, the control unit 111 detects the voltage drop and resets the operation of the optical disc device 1 to make it re-start in order avoid occurrence of an undesirable action. The resetting operation is also performed in starting the optical disc device 1 including firmware when the power is first supplied. These resetting operations are commonly called a power-on reset.

When the power supplying capability of the host computer 2 (PC) that supplies the power to the optical disc 1 (ODD) is insufficient, after the power has been supplied to the optical disc device 1 to make it start, such a problem may occur every time at each of operations, for example, the loading mechanism functions in order to load the optical disc 101 are acted, the spindle motor 105 is started, the sled motor 103 is started, or the tracking actuator 119 and the focus actuator 120 are started, that the power-on reset occurs and a writing or reading operation for an information data is not smoothly performed. In addition, in the case that the power-on reset occurs when the optical pickup 102 performs the information data writing or reading operation, such a problem may also occurs that an error happens in data writing or reading and hence an expected recording or regenerating operation is not performed. The higher the speed at which data writing or reading is performed, the more the rotating speed of the spindle motor 105 is increased and the more the power-on reset is liable to occur, when X-times high speed data writing or reading is performed.

According to an embodiment, the ODD has a determining function as described hereinafter in order to solve the problem that the power-on reset occurs due to the insufficient power supplying capability of a PC used. Since a case in which the ODD independently performs the determining function and a case in which the ODD performs the determining function under a command from a PC used are thought of, these cases will be described separately.

First a case in which the ODD independently performs a function of judging the power supplying capability of a PC connected with the ODD will be described. First, the ODD executes a predetermined operation using large current consumption to judgment whether a power-on reset occurs or not. When it has been judged that the power-on reset has occurred, the power supplying capability of the PC is recognized to be low, the speed, for example, in X-times high speed writing or reading is restricted as will be described later to change the actual operational specification to be lower in values than the highest specification set for the ODD.

In a case the judging operation is performed every time when the power is supplied to the ODD, it is possible to decide the operational specification securely even when a PC to be connected with the ODD is replaced with another one.

In a case the judging operation is performed when the ODD is in an inoperative state such as, for example, a standby state after the power has been supplied to the ODD, it is possible to eliminate such an inconvenience that judgment is repeatedly performed every time the power is supplied to the ODD which is used every time.

In addition, with no particular judgment of the power supplying capability of a PC used unlike the above, such a method may be used that, when a power-on reset has occurred in operation of the ODD, the specification involving the operation is changed to be lower in values so as to regulate the speed at which, for example, X-times high speed writing or reading is performed. In this case, although the power-on reset may occur once when the actual writing or reading operation is performed, problems which would occur after that will be avoided.

Next, a case in which a PC instructs an ODD which is connected therewith to judgment the power supplying capability of the PC so as to decide the operational specification, unlike the above mentioned case that the ODD performs judgment independently, will be described. The PC holds a program used for giving the instruction. When the ODD is connected with the PC, a user uses the program to determine whether the above function is to be performed and then to instruct the ODD to perform or not to perform the function. When the user has instructed the ODD to perform the function, the PC transmits a command corresponding to the instruction to the ODD. The ODD which has received the command judges the power supplying capability of the PC in the same manner as the above and changes the operational specification as required.

When the user has instructed the ODD not to perform the function, the PC transmits a command different from the above to the ODD in response to the instruction. In this case, the ODD changes the specification involving the operation to be lower in values when a power-on reset has occurred in operation, without specially performing judgment as to insufficiency of the power supplying capability of the PC.

As a method for changing the actual operation specification to be lower in values than the highest specification set for the ODD on the side of the ODD, the following methods may be given by way of example.

As one of the most effective methods, a method of reducing the rotating speed of the spindle motor 105, that is, a method of restricting the drive power current of the spindle motor 105 so as to reduce the highest speed attained when data writing or reading is performed, for example, from the ×8 speed to the ×4 or ×2 speed is given. In this case, it is desirable to attain the highest possible speed within a range that a power-on reset does not occur.

It is also desirable to restrict the drive power current of the sled motor 103 corresponding to the drive power current of the spindle motor 105.

It is also effective to restrict the current of the spindle motor 103 at start-up or speed change, and it is also effective to restrict the drive power current of the tracking actuator and the drive power current of the focus actuator.

Next, a method of judging whether a power-on reset occurs or not by executing a predetermined operation using large current consumption and setting the operation mode of an ODD on the side of the ODD will be described in detail.

FIG. 2 is a flowchart of a method of setting an operation mode of the optical disc device (ODD) 1 according to an embodiment.

The flow is started by connecting the ODD 1 with the PC 2 and then supplying the power from the PC 2 to the ODD 1.

The control unit 111 of the ODD 1 judges whether this-time power supply is the first-time power supply performed after the ODD 1 has been connected with the PC 2 in step S201.

When it has been judged as the first-time power supply (Yes in the drawing) as a result of judgment in step S201, the process proceeds to step S202 and the control unit 111 prepares a flag indicating that the power is being supplied to the ODD and stores it in a nonvolatile memory. The nonvolatile memory may be a memory built into the control unit 111 or the DSP 109, or may be a memory externally attached to one of them.

Then, an operation using large current consumption is executed in step S203. The control unit 111 instructs, for example, the spindle motor 105 to make it rotate at the highest speed or instructs the sled motor 103 to make it rotate at the highest speed. The above mentioned operation is continuously performed for a predetermined period of time, for example, two seconds.

Then, the control unit 111 judges whether a trouble has occurred while the above mentioned operation was being continuously performed for the predetermined period of time on the basis of presence/absence of a power-on reset in step S204.

When it has been judged that no trouble has occurred while the above mentioned operation was being continuously performed as a result of judgment in step S204 (No in the flowchart), the process returns to step S205 and the power supply flag stored in the nonvolatile memory is cleared. In the above mentioned case, since no trouble will occur even if, for example, the spindle motor 105 and the sled motor 103 are rotated at high speeds, the mode is set to the normal operation mode in which the ODD 1 is operated with the highest specification left unchanged and then the flow is terminated.

When it has been judged that a trouble has occurred while the above mentioned operation was being continuously performed (Yes in the flowchart) as a result of judgment in step S204, the process returns to step S201. It is judged again whether the power supply is the first-time power supply performed after the ODD 1 has been connected with the PC 2 in step S201. In the above mentioned case, since it is not the first-time power supply, No is judged in the flowchart. In the above mentioned case, since an error will occur if the ODD 1 is operated at least with the highest specification left unchanged, the operational specification is appropriately changed to be lower in values and then the flow is terminated. The operation performed in a state that the operational specification is appropriately changed to be lower in values may be an operation performed in a state that the rotating speed of, for example, the spindle motor 105 is reduced to a predetermined speed which is lower than its highest speed.

According to the abovementioned embodiment, it may be unnecessary for the PC to have a test mode which is different from a normal use state. In addition, the ODD is allowed to operate with the power supplied via the USB port and on the basis of a predetermined operational specification even when the power supplying capability of the PC is insufficient. The ODD is allowed to operate with a maximum operating performance when the power supplying capability of a power source from which the power is supplied to the ODD via a USB port is sufficient.

When Yes is obtained as a result of judgment in step S204 in FIG. 2, the process may return to step S203, an operation of rotating, for example, the spindle motor 105 at a predetermined speed lower than its highest speed may be executed in step S203 unlike the above mentioned case, and the operation of the ODD 1 may be set by obtaining the highest possible speed at which No is judged in step S204. As a result, it is allowed to set the operational specification of the ODD 1 in a state that the power supplying capability of the PC is more effectively utilized.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc device that regenerates information data from data in an optical disc with the power supplied from a host device, comprising:
a spindle motor configured to rotate the optical disc;
an optical pickup having an objective lens through which the optical disc is irradiated with a laser beam, a tracking actuator configured to finely adjust a radial position of the objective lens relative to the optical disc, a focus actuator configured to finely adjust a vertical position of the objective lens relative to the optical lens, and a photodetector configured to detect light of the laser beam which is reflected from the optical disc and to read and convert the information data written in the optical disc into an electric signal to be output;
a sled motor configured to move the optical pickup in a radius direction relative to the optical disc to determine a relative position;
a servo unit configured to generate a drive signal used to finely adjust the position of the objective lens relative to the optical disc and to supply the drive signal to the tracking actuator and the focus actuator;
a signal processing unit configured to process the electric signal output from the optical pickup, to supply the electric signal to the host device, and also to supply the electric signal to the servo unit in order to generate the drive signal; and
a control unit configured to control the operation of the optical disc,
wherein, when a power-on reset for re-starting the optical disc device is judged to have occurred after the optical disc device has been connected with the host device and started, but before the information data is regenerated, the control unit controls the operation of the optical disc device so as to reduce current consumption by the optical disc device.

2. The optical disc device according to claim 1, wherein the control unit instructs any one of or a plurality of the above constitutional element(s) to consume a predetermined amount of current to judge whether the power-on reset occurs.

3. The optical disc device according to claim 2, wherein the constitutional element which is instructed to consume the predetermined amount of current is the spindle motor.

4. The optical disc device according to claim 2, wherein the constitutional element which is instructed to consume the predetermined amount of current is the sled motor.

5. The optical disc device according to claim 1, wherein the control unit judges whether the power-on reset has occurred in a standby term, for which the information data is not regenerated, after the optical disc device has been connected with the host device and started.

6. The optical disc device according to claim 1, wherein the reduced current consumption is greater than zero.

7. The optical disc device according to claim 1, wherein the reduced current consumption is sufficient for the optical disc device to continue operating.

8. The optical disc device according to claim 1, wherein the reduced current consumption is obtained by restricting the writing and/or reading speed to a value lower than highest specification set for the optical disc device.

9. A method of setting an operation mode of an optical disc device that regenerates information data from data in an optical disc with the power supplied from a host device, comprising:
a power supply state judging step of judging whether the optical disc device is in a power supply state before the operation mode is set;
a current consumption increasing step of, when it has been judged that optical disc device is in the power supply state before the operation mode is set as a result of judgment in the power supply state judging step, storing that the optical disc device is in the power supply state and increasing the current consumption for a predetermined period of time; and
a power-on reset judging step of judging whether a power-on reset has occurred in the current consumption increasing step;
wherein when the power-on reset judging step determines that the power-on reset has not occurred, memory that the optical disc device is in the power supply state is cleared and the optical disc device is set to a predetermined operation mode; and
wherein when the power-on reset judging step has determined that the power-on reset has occurred, but before the information data is regenerated, the optical disc device is set to an operation mode which has a smaller current consumption than the predetermined operation mode.

10. The method of setting an operation mode of an optical disc device according to claim 9, wherein the smaller current consumption is greater than zero.

11. The method of setting an operation mode of an optical disc device according to claim 9, wherein the smaller current consumption is sufficient for the optical disc device to continue operating.

12. The method of setting an operation mode of an optical disc device according to claim 9, wherein the smaller current consumption is obtained by is obtained by restricting the writing and/or reading speed to a value lower than highest specification set for the optical disc device.

* * * * *